United States Patent [19]

Circle et al.

[11] 3,926,940

[45] Dec. 16, 1975

[54] PROTEIN RECOVERY PROCESS FROM DEFATTED SOYBEANS USING WATER TO REDUCE AMOUNT OF MISCIBLE SOLVENT

[75] Inventors: Sidney Joseph Circle; Richard Raymond Fergle, both of Richardson; Leslie Ray Watkins, Houston; Daniel Edwards Hooton, Dallas, all of Tex.

[73] Assignee: Anderson, Clayton & Co., Houston, Tex.

[22] Filed: Jan. 14, 1974

[21] Appl. No.: 432,886

Related U.S. Application Data

[63] Continuation of Ser. No. 189,505, Oct. 15, 1971, abandoned.

[30] Foreign Application Priority Data

Nov. 5, 1970 United Kingdom............... 52578/70
Nov. 5, 1970 United Kingdom............... 52579/70
Nov. 5, 1970 United Kingdom............... 52580/70

[52] U.S. Cl........................... 260/123.5; 260/112 R
[51] Int. Cl.²............................................. A23J 1/14
[58] Field of Search................................ 260/123.5

[56] References Cited
UNITED STATES PATENTS

2,278,670 4/1942 Rauer............................ 260/123.5
3,168,406 2/1965 Moshy....................... 260/123.5 X

OTHER PUBLICATIONS

Cereal Chemistry, Vol. 41, pp. 328–339, 1964, Wolf et al.
Food Industries, pp. 616 and 664, 1944, Beckel et al.
Industrial and Engineering Chemistry, Vol. 36, No. 9, 1944, pp. 799–803.
Encyclopedia of Chemical Technology, Kirk et al., Vol. 12, 1954, pp. 641–646.
Cereal Chemistry, Vol. 46, pp. 156–163, Fukushima, 1969.
J. Am. Oil Chemists Society, Vol. 50, pp. 426A–435A, 1973, Cowan et al.
Cereal Chemistry, Vol. 40, pp. 450–458, Roberts et al., 1963.
Cereal Chemistry, Vol. 40, pp. 504–514, Wolf et al., 1963.
Agricultural and Food Chemistry, Vol. 11, pp. 323–328, Eldridge et al., 1963.
Cereal Chemistry, Vol. 27, pp. 258–269, 1950, Mann et al.
J. Agricultural Food Chemistry, Vol. 15, pp. 102–108, Nash et al., 1967.
Cereal Chemistry, Vol. 48, pp. 360–368, Nash et al., 1971.

*Primary Examiner*—Howard E. Schain
*Attorney, Agent, or Firm*—Fulbright & Jaworski

[57] ABSTRACT

This is a process for the recovery of protein in an aqueous solution by precipitating the protein as curd, washing the protein with a water-miscible organic solvent to remove unwanted color and flavor constituents, providing a series of zones in each of which zones the solvent-washed curd is mixed with water, the mixture is passed to a separator to separate the curd from the liquid with this process being repeated until the amount of solvent in the curd is reduced to less than about 10% by weight of the liquid portion of the curd. The pH of the curd is then adjusted to a desired value and thereafter the curd may be handled in a wet state or dried.

20 Claims, 2 Drawing Figures

PROTEIN RECOVERY PROCESS FROM DEFATTED SOYBEANS USING WATER TO REDUCE AMOUNT OF MISCIBLE SOLVENT

CROSS-REFERENCES TO RELATED APPLICATIONS

This application is a continuation of application Ser. No. 189,505 filed on Oct. 15, 1971 for "Protein Recovery Process" and now abandoned in favor of this application.

BACKGROUND OF THE INVENTION

The field of art to which the invention pertains is the production of protein from various raw materials comprising vegetable protein sources including protein-bearing oil seeds such as soybeans and cottonseed; cereal grains such as corn and wheat; and animal protein sources including fish and meat. In such production of protein, one convenient raw material is soybean flakes which have had the oil removed from them by solvent extraction, normally with hexane as the solvent. Conventionally, in the preparation of such extracted flakes, the whole or cracked soybean seed is passed through smoothing rolls to produce the flakes, and then these flakes are treated with solvent to remove the oil.

The protein, as it comes from various of the raw materials discussed above, is associated with constituents that give it color and a bitter and/or beany taste and flavor. It is desirable that these constituents be removed. This is often accomplished by washing or contacting the protein, either in the form of a curd or while solubilized, or both, with an alcohol, preferably ethyl alcohol, or other water-miscible organic solvent.

Where such protein is intended for food use, the major portion of the solvent which remains with the protein must be reduced to levels compatible with food laws and regulations. Also, removal of such solvent must be accomplished in such a manner as to prevent the loss of desirable functional properties of the protein, particularly those associated with the protein's solubility in water, which occurs as a result of protein denaturation. Such protein denaturation is a function of solvent concentration, temperature and time of contact and is usually measured by the solubility of the protein in water.

To Applicants' knowledge, the reduction of residual solvent in the protein to acceptable levels has heretofore involved methods which were either high temperature (for example steam stripping) which causes protein denaturation and loss of associated functional properties, or low temperature techniques (for example stripping with inert gas or vacuum) which exceeded generally recognized economical limits of manufacturing costs.

The present invention provides a reduction of the solvent to acceptable levels without causing appreciable denaturation and without the expenses of the low temperature techniques.

SUMMARY OF THE INVENTION

It is a general object of the present invention to provide a process for the recovery of protein which has been washed with a water-miscible organic solvent in which process the protein is not appreciably denatured as a result of the contact with solvent, and in which process the solvent content of the protein is reduced so low that the protein may be dried under drying temperatures common to the industry without loss of protein functionality.

It is a still further object of the present invention to provide such a process in which the solvent is removed from the curd by passing the curd through a series of one or more zones in which it is mixed with water and the liquid thereafter separated from the curd.

Other and further objects, features and advantages will be apparent from the following description of the invention given for the purpose of disclosure.

The present invention is based upon the discovery that in a process for the recovery of protein from an aqueous solution having a pH between about 6 and 12, in which process acid is added to the solution to reduce its pH sufficiently to cause the protein to precipitate as a curd and the protein is washed with a water-miscible organic solvent to remove undesirable color and flavor constituents, either before or after the precipitation as a curd, the solvent can be removed from the curd without denaturation of the protein and the protein may be heat dried at temperatures common to the industry (for example spray drying at an inlet temperature of 400° to 425° F. and an outlet temperature of 180° to 190° F.) without loss of functional properties of the protein if there is provided a series of zones, of at least one in number, in each of which zones the solvent-washed curd is intimately mixed with water, the mixture is passed to a separator and the curd separated from the liquid, with the procedure being repeated until the amount of solvent in the curd is reduced to less than about 10% by weight of the liquid portion of the curd. The pH of the curd is then adjusted if desirable and thereafter the curd is handled in the wet state or dried, preferably by spray drying.

Preferably the protein source is soybean flakes from which the oil has been removed, the solvent is ethyl alcohol, the amount of solvent in the curd is reduced to less than about 5% by weight by passing through the zones and in one or more of the zones at least a portion of the liquid separated from the curd in that zone is mixed with the curd in a preceding zone.

The entire process, down to the drying, may be carried out at ambient temperatures and pressures.

DESCRIPTION OF THE PREFERRED EMBODIMENT

Figure 1:
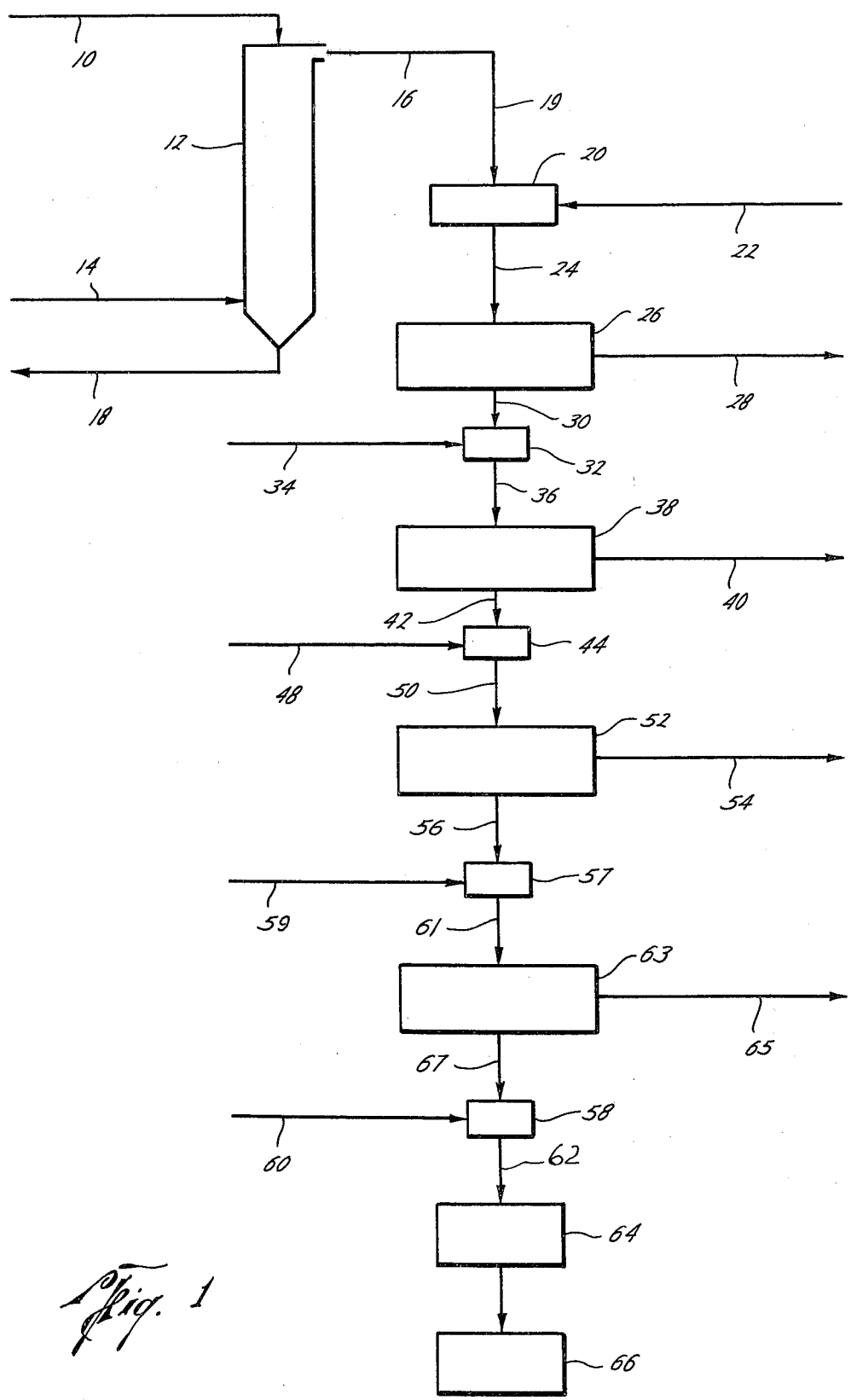
FIG. 1. and 2, are schematic illustrations of the process of the present invention with the disclosure in FIG. 2 being preferred.

Referring to FIG. 1, the raw material, preferably dried hexane-extracted soybean flakes, is introduced through line 10 into the top of a continuous countercurrent extraction column 12 with the flakes being moved countercurrent to a stream of water entering at line 14 and leaving as overflow liquor at line 16. The spent flakes leave the bottom of the extraction column 12 at outlet 18 and are not further involved in this process. Typical flakes entering the top of column 12 will have about 50% protein, some fiber and nonprotein solubles (mainly sugars) in addition to various other ingredients, including undesirable flavor and color constituents.

Water entering at line 14 is preferably at about 190° F. and has a temperature of about 140° F. when it leaves at line 16 in the particular size of column 12 contemplated. Water at a temperature below about 160° F. will extract protein from the soybean flakes. Above about 160° F., the protein becomes progressively less soluble with increase in temperature to the point of almost complete insolubility above about 190° F. While the temperature of the water during extraction should not be over 160° F., temperatures excessively below 140° F. can cause problems of souring and spoiling of the raw material in the extractor 12 due to bacteria growth. Such bacteria growth can be prevented by adding a preservative or bacteriostatic agent to the extractor 12.

In the event that an aqueous solution containing a bacteriostatic or bactericidal agent, such as water-miscible alkanols, for example methanol, ethanol, isopropanol, normal propanol, is introduced into the extractor 12, then the exit temperature of the extract leaving at line 16 can be reduced to room temperature and below.

The purpose of the extractor 12 is to extract the water-soluble protein in the flakes and any of the extractors conventionally used in the art for extracting protein from proteinaceous raw material may be used so long as the extraction step is carried out by liquid in contact with the solid raw materials.

If desired, all or a portion of the contents of the extractor 12 may be made alkaline by adding sodium hydroxide, potassium hydroxide, or other acceptable alkaline metal or alkaline earth hydroxides, phosphates or carbonates. Generally, the pH of the liquor in line 16 should be somewhere between 6 and 12 although a pH of about 7 is preferred.

The extract liquor leaving the extractor 12 in line 16 contains the protein and other water solubles. It is passed to line 19 and flows through that line, and a cooler if desired, into a mixer or disperser 20 where it is mixed with solvent, water and sufficient hydrochloric acid or other food grade acid from line 22 to cause the protein to precipitate as "curd." This is normally a pH between about 4.0 and 5.5. The water, sugars and the nonprecipitable protein remaining in solution in the mixer is called "whey."

The mixer 20 (and the other mixers used herein) can be one of many conventional mixers for mixing liquids and solids. Preferably it is a tank with mixing blades.

The contents of the mixer 20 continuously flow through line 24 into a continuous liquid-solid separator 26, preferably a centrifuge. In the liquid-solid separator 26, the whey is continuously separated from the curd and leaves the line 28. The solvent in the whey may be recovered by any conventional means. The wet solids from the liquid-solid separator 26 then pass through line 30 to a second mixer 32 where they are intimately contacted with a mixture of fresh water and solvent entering through line 34. The contents of the mixer 32 pass through line 36 to another liquid-solid separator 38 from which the whey and solvent are removed through line 40 for later recovery of the solvent with the wet solids being removed through line 42 and passed to a third mixer 44.

Water is added through line 48 to the mixer 44 and the contents of the mixer 44 are passed through line 50 to a liquid-solid separator 52 from which the whey and solvent are removed through line 54.

The wet protein solids from the liquid-solid separator 52 pass through line 56 to another mixer 57 where they are contacted with water added through line 59. The contents of the mixer 57 are passed through a line 61 to a liquid-solid separator 63 from which the whey and solvent are removed through line 65.

The wet protein solids from the liquid-solid separator 63 pass through line 67 to another mixer 58 where they are intimately contacted with enough alkali, preferably sodium hydroxide, or enough acid, preferably hydrochloric, entering through line 60 to adjust the pH of the material in the mixer 58 to the desired value.

The curd leaving the last liquid-solid separator 63 should have a solvent content of less than about 10% by weight of the liquid portion of the curd. Any number of successive zones of mixing the water and curd and thereafter separating the liquid and wet solid may be used to bring the level of the solvent in the curd down to the desired amount.

The material leaving the mixer 58 passes through line 62 to a drier 64, preferably a spray drier, to remove water from the product. From the drier 64, the dried product is removed to storage 66.

Figure 2:
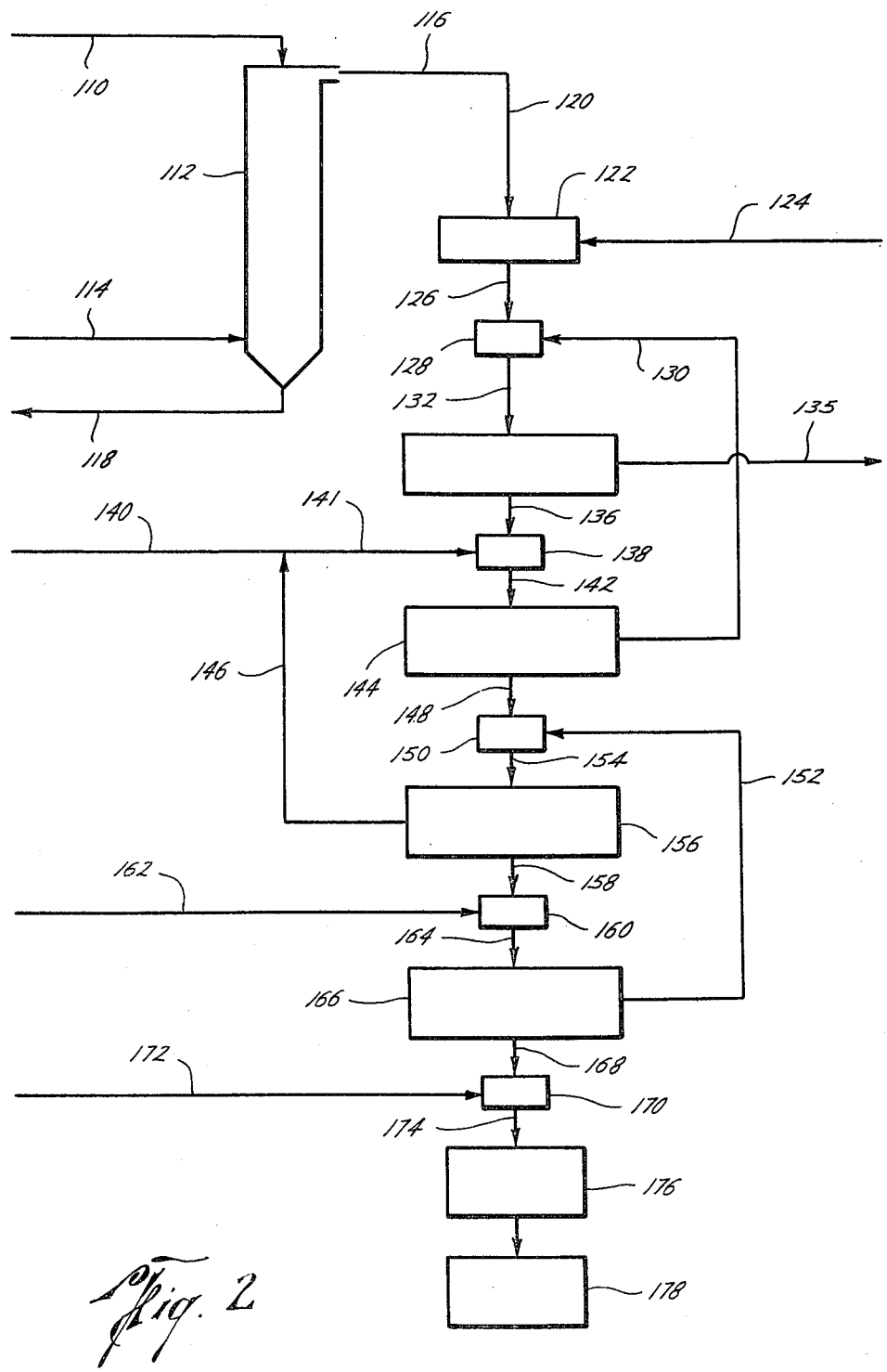

In the arrangement shown in FIG. 2, the raw material is moved through the line 110 into the extractor 112 and contacted with an aqueous stream entering at line 114 and leaving as extract liquor through line 116. The spent raw material leaves the extractor 112 through a line 118.

The overflow liquor in line 116 flows through line 120 to a mixer or disperser 122 into which sufficient acid is added through line 124 to precipitate the protein in the form of curd.

The contents of the mixer 122 continuously flow through line 126 into a mixer 128 where they are mixed with whey and solvent entering from line 130 as later described. The contents of the mixer 128 flow through line 132 to a continuous liquid-solid separator 134 from which the liquids leave through line 135 and the wet solids leave through line 136 to a mixer 138. Fresh solvent from line 140 and a mixture of whey and solvent from line 146 enter line 141 and flow into the mixer 138 for contact with the protein solids for washing.

The contents of the mixer 138 flow through line 142 into another liquid-solid separator 144 from which the whey and solvent pass through line 130 back to the mixer 128. The wet solids from the liquid-solid separator 144 pass through line 148 to a mixer 150 where they are contacted with whey and solvent from line 152, as later described. The contents of the mixer 150 pass through the line 154 to another liquid-solid separator 156 from which the liquids pass through the line 146 as previously described. The wet solids from the liquid-solid separator 156 pass through line 158 to a mixer 160 where they are mixed with fresh makeup water from line 162.

The contents of this mixer 160 pass through the line 164 to another liquid-solid separator 166 from which the liquids, principally water, are removed through line 152 for re-entry at the mixer 150 as previously described. The wet solids from the liquid-solid separator 166 are passed through line 168 to a mixer 170 into which dilute alkali or acid is introduced through line 172 to adjust the pH of the contents of the mixer 170 to the desired value.

The contents of the mixer 170 are then passed through line 174 into a drier 176 to form a dried protein product which is then removed to storage at 178.

In the processes of FIGS. 1 and 2, the amount of solvent in the protein immediately prior to the curd being dried depends, of course, upon the concentration of the solvent entering earlier in the process and the number of repeating combinations of mixers and liquid-solid separators. In any of the illustrations, the amount of solvent in the protein prior to drying can be decreased or increased by adding or removing respectively sets of mixers and/or liquid-solid separators and by changes in the liquid recycle patterns and the rates and concentrations of the liquid flows.

In the processes of FIGS. 1 and 2, there will, of course, be accessory equipment such as pumps, controls, valves, etc., but their use is well understood and their inclusion in the descriptive material herein is not necessary for understanding the process.

Set forth hereafter are various examples illustrating the present invention.

EXAMPLE 1.

Using the apparatus of FIG. 1, the extractor 12 was operated to produce liquid in line 16 at the rate of 25 gallons per hour. Each 135 parts of the liquid in this line 16 contained 13.5 parts of soluble solids which included 6.5 parts of recoverable acid precipitable protein. Into the mixer 20 through line 22 there was added, for each 135 parts of material entering the mixer 20 from line 19, 110 parts of water, sufficient 3 N. hydrochloric acid to reduce the pH to 4.5 in the mixer 20, and 85 parts of 95% ethyl alcohol. The curd formed in the mixer and both the curd and liquids were passed to the separator 26 which removed 281.5 parts liquid with an alcohol concentration of 26% and 6.3 parts solids on a dry basis. The wet solids material from the separator 26 contained 7.2 parts solids and 30 parts liquid (also with 26% alcohol content). These were passed to the mixer 32 where they were mixed with 100 parts of 95% ethyl alcohol and 110 parts water. This mixture flowed to the separator 38 with the whey from that separator leaving through line 40 containing 0.3 parts solids and 217 parts liquid which was 43% alcohol. The wet solids content leaving the separator 38 was 6.9 parts solids on a dry basis and 23 parts liquid also having a 43% alcohol content.

This material was passed into the mixer 44 where it was mixed intimately with 120 parts water from line 48 and passed to the separator 52. From the separator 52, the whey flowing out line 54 had 0.2 parts solids and 126 parts liquid which was 7% alcohol. The wet solids contained 6.7 parts solids on a dry basis and 17 parts liquid also of 7% alcohol, all of which flowed into the mixer 57.

In mixer 57, 120 parts of water were added from line 59 with the mixture being passed to the separator 63. Whey in the line 65 from the separator 63 contained 0.2 parts solids on a dry basis and 120 parts liquid having a concentration of 0.9% alcohol. The wet solids leaving that separator 63 had 6.5 parts solids on a dry basis and 17 parts liquid at 0.9% alcohol. This material passed to the mixer 58 where it was blended with 0.13 parts sodium hydroxide in 35 parts of water. This sodium hydroxide solution substantially neutralized the curd which was spray dried under commercially acceptable conditions of temperature of 400° F. at the inlet and 180° F. at the outlet. The dried sodium proteinates were found to be completely soluble when tested by the Nitrogen Solubility Index Procedure (NSI) as described in A.O.C.S. method Ba 11–65, Revised 1969, the Official and Tentative Methods of the American Oil Chemists' Society, Third Edition, 1970. They were also found to have an alcohol concentration of less than 0.0025% as shown in the following table of tests on three different samples taken from the drier 64.

| Sample | % $H_2O$ | % Protein As Is | % Protein Dry Basis | Nitrogen Solubility Index | Ethanol Concentration |
|---|---|---|---|---|---|
| A | 4.6 | 91.7 | 96.1 | 100 | 0 |
| B | 4.2 | 92.0 | 96.2 | 98 | 5 ppm |
| C | 4.7 | 92.5 | 97.3 | 98 | <5 ppm |

EXAMPLE 2

This illustrates how the process of FIG. 2 can be operated assuming that the material leaving the extractor 112 in line 116 has a pH of 7, contains 635 parts of soluble solid (including 325 parts of acid-precipitable protein) and 5,828 parts liquid. This passes to the mixer 122 where it is blended with sufficient hydrochloric acid from line 124 to reduce the pH to 4.5 and form a curd. The curd and whey are passed to the mixer 128 where they are mixed with liquid from line 130 containing 29 parts solids on a dry basis and 8,684 parts liquid having an alcohol content of 43.8%. The material from this mixer 128 flows to the separator 134. The whey from separator 134 leaving through line 135 will contain 310 parts solids and 13,212 parts liquid which is 26.5% alcohol. The wet solids leaving the separator 134 will contain 354 parts solids on a dry basis and 1,300 parts liquid with 26.5% alcohol. These pass to the mixer 138 where they are blended with 3,684 parts of 95% ethyl alcohol from line 140 and a solution from line 146 containing 4 parts solids and 5,000 parts liquid which is 10.8% ethyl alcohol.

The material leaving the mixer 138 passes to the separator 144 from which the whey content in line 130 has been previously given. The wet solids from this separator 144 will contain 329 parts solids on a dry basis and 1,300 parts liquid of 43.8% alcohol. These pass to the mixer 150 where they are blended with a solution containing 2 parts solids and 5,000 parts of liquid having a 2.2% alcohol content flowing in line 152. The material from this mixer 150 passes to the separator 156 which produces the whey in line 146 previously described. The wet solids from the separator 156 will contain 327 parts solids on a dry basis and 13,000 parts liquid of 10.8% alcohol content. These solids pass to the mixer 160 where they are blended with 5,000 parts of water from line 162 and the mixture then passes to the separtor 166. The whey content of line 152 from that separator 166 has previously been given. The wet solids from the separator 166 contain 325 parts solids on a dry basis and 1,300 parts liquid at 2.2% alcohol. These pass to the mixer 170 where they are blended with 5% sodium hydroxide and 95% water from line 172 to neutralize the curd.

Following neutralization of the curd, the neutralized protein may be spray dried and will be found to be completely soluble when tested by NSI procedure and to have alcohol concentration less than 0.0025%.

From the foregoing discussions, examples and description of the invention, it is apparent that the objects set forth herein as well as others have been achieved. Those skilled in the art will recognize that the principles of this invention may be applied in several ways, only a few of which have been exemplified herein specifically. Accordingly, the invention is to be limited only by the spirit thereof and the scope of the appended claims.

What is claimed is:

1. In a process for recovery of protein from an aqueous solution having a pH between about 6 and 12, the protein in said solution having been derived from soybeans from which substantially all oil has been removed, in which process acid is added to the solution to reduce its pH sufficiently to cause the protein to precipitate as a curd and the protein is treated with a water-miscible organic solvent to remove undesirable color and flavor constituents, said solvent being added either before or after the precipitation of the curd, the improvement comprising providing a series of N zones wherein N is an integer of at least 1 and in each of which zones the solvent-treated curd is intimately mixed with water forming a mixture of liquid and curd, the mixture is passed to a separator and the curd separated from the liquid, said zones being sufficient to reduce the amount of solvent in the curd to less than about 10% by weight of the liquid portion of the curd without appreciable denaturation of protein of the curd.

2. The process of claim 1 in which the solvent is ethanol and the amount of ethanol in the curd is reduced to less than about 5% by weight of the liquid portion of the curd.

3. The improvement of claim 1 in which the process for recovery of protein is a continuous process.

4. The process of claim 3 in which the amount of solvent in the curd is reduced to less than about 5% by weight of the liquid portion of the curd.

5. In a process for the recovery of protein from an aqueous solution having a pH between about 6 and 12, the protein in said solution having been derived from soybeans from which substantially all oil has been removed, in which process acid is added to the solution to reduce its pH sufficiently to cause the protein to precipitate as a curd and the protein is treated with a water-miscible organic solvent to remove undesirable color and flavor constituents, said solvent being added either before or after the precipitation of the curd, the improvement comprising:
   a. providing a series of N zones wherein N is an integer of at least 1 and in each of which zones the solvent-treated curd is intimately mixed with water forming a mixture of liquid and curd, the mixture is passed to a separator and the curd separated from the liquid, said zones being sufficient to reduce the amount of solvent in the curd to less than about 10% by weight of the liquid portion of the curd without appreciable denaturation of protein of the curd, and thereafter
   b. adjusting the pH of the curd to the desired value.

6. The process of claim 5 in which the curd is dried without loss of protein functionality after its pH has been adjusted.

7. The process of claim 5 in which the amount of solvent in the curd is reduced to less than about 5% by weight of the liquid portion of the curd.

8. The process of claim 6 in which the solvent is ethanol and the amount of ethanol in the curd is reduced to less than about 5% by weight of the liquid portion of the curd.

9. The improvement of claim 5 in which the process for recovery of protein is a continuous process.

10. The improvement of claim 7 in which the process for recovery of protein is a continuous process.

11. The process of claim 5 in which the pH of the curd in step (b) is adjusted to approximately a neutral pH.

12. In a process for the recovery of protein from an aqueous solution having a pH between about 6 and 12, the protein in said solution having been derived from soybeans from which substantially all oil has been removed, in which process acid is added to the solution to reduce its pH sufficiently to cause the protein to precipitate as a curd and the protein is treated with a water-miscible organic solvent to remove undesirable color and flavor constituents, said solvent being added either before or after the precipitation of the curd, the improvement comprising:
   a. providing a series of N zones wherein N is an integer of at least 1 and in each of which zones the solvent-treated curd is intimately mixed with water forming a mixture of liquid and curd, the mixture is passed to a separator and the curd separated from the liquid, said zones being sufficient to reduce the amount of solvent in the curd to less than about 10% by weight of the liquid portion of the curd without appreciable denaturation of protein of the curd, and thereafter
   b. drying the curd at the desired pH value without loss of protein functionality.

13. The process of claim 12 in which the amount of solvent in the curd is reduced to less than about 5% by weight of the liquid portion of the curd.

14. The improvement of claim 12 in which the process for recovery of protein is a continuous process.

15. The process of claim 14 in which the amount of solvent in the curd is reduced to less than about 5% by weight of the liquid portion of the curd.

16. In a continuous process for the recovery of protein from an aqueous solution having a pH between about 6 and 12, the protein in said solution having been derived from soybeans from which substantially all oil has been removed, in which process acid is added to the solution to reduce its pH sufficiently to cause the protein to precipitate as a curd and the protein is treated with a water-miscible organic solvent to remove undesirable color and flavor constituents, said solvent being added either before or after the precipitation of the curd, the improvement comprising:
   a. providing a series of N zones wherein N is an integer of at least 2 and in each of which zones the solvent-treated curd is intimately mixed with water forming a mixture of liquid and curd, the mixture is passed to a separator and the curd separated from the liquid, said zones being sufficient to reduce the amount of solvent in the curd to less than about 10% by weight of the liquid portion of the curd without appreciable denaturation of protein of the curd, and
   b. mixing at least a portion of the liquid separated from the curd in one of the zones with the curd in a preceding zone.

17. The process of claim 16 in which the amount of solvent in the curd is reduced to less than about 5% by weight of the liquid portion of the curd.

18. In a continuous process for the recovery of protein from an aqueous solution having a pH between about 6 and 12, the protein in said solution having been derived from soybeans from which substantially all oil has been removed, in which process acid is added to the solution to reduce its pH sufficiently to cause the protein to precipitate as a curd and the protein is treated with a water-miscible organic solvent to remove undesirable color and flavor constituents, the solvent being added either before or after the precipitation of the curd, the improvement comprising:
  a. providing a series of N zones wherein N is an integer of at least 2 and in each of which zones the solvent-treated curd is intimately mixed with water forming a mixture of liquid and curd, the mixture is passed to a separator and the curd separated from the liquid, said zones being sufficient to reduce the amount of solvent in the curd to less than about 10% by weight of the liquid portion of the curd without appreciable denaturation of the protein of the curd,
  b. mixing at least a portion of the liquid separated from the curd in one of the zones with the curd in a preceding zone, and thereafter
  c. adjusting the pH of the curd to the desired value.

19. The process of claim 18 in which the curd is dried after its pH has been adjusted without loss of protein functionality.

20. In a continuous process for the recovery of protein from an aqueous solution having a pH between about 6 and 12, the protein in said solution having been derived from soybeans from which substantially all oil has been removed, in which process acid is added to the solution to reduce its pH sufficiently to cause the protein to precipitate as a curd and the protein is treated with a water-miscible organic solvent to remove undesirable color and flavor constituents, said solvent being added either before or after the precipitation of the curd, the improvement comprising:
  a. providing a series of N zones wherein N is an integer of at least 2 and in each of which zones the solvent-treated curd is intimately mixed with water forming a mixture of liquid and curd, the mixture is passed to a separator and the curd separated from the liquid, said zones being sufficient to reduce the amount of solvent in the curd to less than about 10% by weight of the liquid portion of the curd without appreciable denaturation of the protein of the curd,
  b. mixing at least a portion of the liquid separated from the curd in one of the zones with the curd in a preceding zone, and thereafter
  c. drying the curd at the desired pH level wihtout loss of protein functionality.

* * * * *